No. 732,223. PATENTED JUNE 30, 1903.
A. E. RHOADES.
DEVICE FOR PLUMBING SPINNING SPINDLES.
APPLICATION FILED APR. 29, 1903.
NO MODEL.
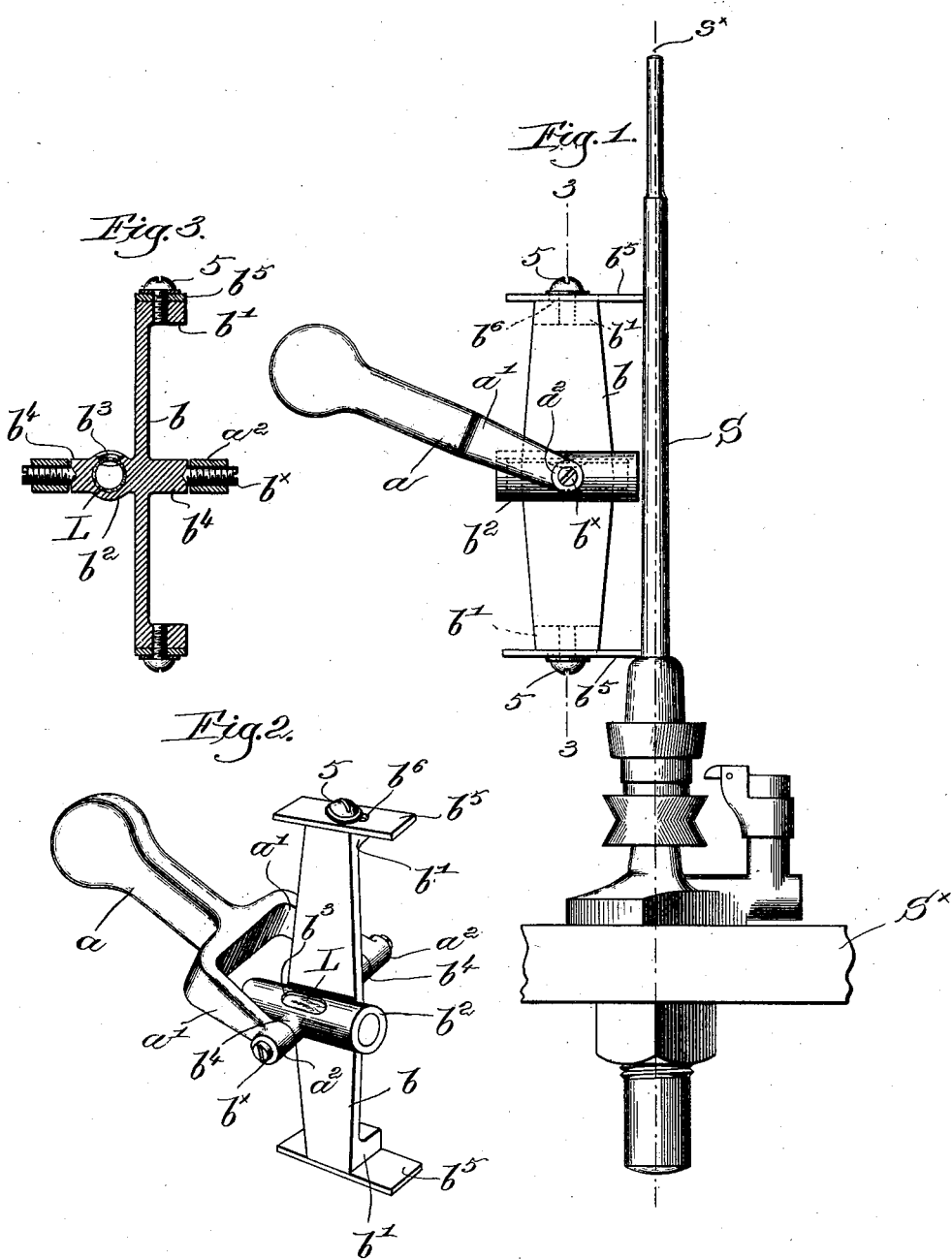
Witnesses:
Thomas J. Drummond
S. William Lutton
Inventor:
Alonzo E. Rhoades,
by Crosby Gregory
Attys.

No. 732,223. Patented June 30, 1903.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

DEVICE FOR PLUMBING SPINNING-SPINDLES.

SPECIFICATION forming part of Letters Patent No. 732,223, dated June 30, 1903.

Application filed April 29, 1903. Serial No. 164,750. (No model.)

*To all whom it may concern:*

Be it known that I, ALONZO E. RHOADES, a citizen of the United States, and a resident of Hopedale, county of Worcester, State of Massachusetts, have invented an Improvement in Devices for Plumbing Spinning-Spindles, of which the following description, in connection with the accompanying drawings, is a specification, like characters on the drawings representing like parts.

It is highly important that the spindles in a spinning-frame or similar apparatus shall be absolutely vertical in order that they may be accurately centered with relation to their rings both at the top and the bottom of the traverse, it being understood that the ring-rail is leveled, so that it will have an accurate vertical reciprocation. Heretofore the devices for determining whether or not the spindles are vertical have been rather crude, more particularly as they are not adapted to determine the condition of the running spindle, and the position of a spindle at rest is not necessarily the same as when it is running.

My present invention has for its object the production of a simple and effective device for plumbing spinning-spindles whether they are running or at rest, it being particularly valuable because of the facility with which it can be used in determining the position of a running spindle.

The various novel features of my invention will be fully described in the subjoined specification and particularly pointed out in the following claims.

Figure 1 is a side elevation of a spindle-leveling device embodying one practical form of my invention, the manner of using the device being illustrated. Fig. 2 is a perspective view of the leveling device; and Fig. 3 is a longitudinal sectional view on the line 3 3, Fig. 1, looking toward the left.

My invention comprises, essentially, a handpiece, a swinging member pivotally mounted thereon and having lateral extensions or contact-pieces at its ends, and a level mounted on said member in parallelism with said extensions.

Referring to the drawings, a handpiece $a$ of a size and shape suitable to be conveniently held in the hand of the operator is shown as bifurcated or branched at one end to present branches or bifurcations $a'$, provided at their extremities with hubs $a^2$ in alinement with each other. Between the hubs the swinging member or level-carrier is mounted, shown as an elongated rigid body $b$, having overturned broadened ends $b'$, the outer faces of which are made parallel, and a level-case $b^2$ is secured to or forms a part of the body substantially midway between its ends and at right angles to the longitudinal axis of the body. A spirit-level L is secured in the case $b^2$ in any suitable manner, the case having a sight-opening $b^3$, Figs. 2 and 3, through which the bubble may be seen. Transverse trunnions $b^4$ on the body $b$ are adapted to enter between the inner ends of the hubs $a^2$ and pivot or fulcrum pins $b^\times$ are screwed into the hubs and loosely enter sockets in the trunnions. (See Fig. 3.) Lateral extensions or contacts $b^5$ are mounted on the ends $b'$ of the swinging member, said extensions being shown as blade-like pieces of metal, preferably hardened steel, and they are adjustably held in place by screws 5, passed through longitudinal slots $b^6$ in the extensions and screwed into the ends $b'$. By loosening a screw 5 its contact-piece $b^5$ can be moved in or out, as desired, for a purpose to be described.

It will be seen that the level is at right angles to the longitudinal axis of the swinging member $b$ and also to the fulcrum thereof, and the level is therein shown in parallelism with the extensions or contacts $b^5$.

In using the device the operator grasps the handpiece $a$ and presents the contacts $b^5$ to the spindle-blade S, Fig. 1, or against a bare bobbin on the spindle if the bobbin be cylindrical, and by a glance at the bubble of the level through the sight-opening $b^2$ it can be instantly seen whether the longitudinal axis of the spindle is vertical or not.

In Fig. 1 a spinning-spindle of well-known type is shown mounted on the spindle-rail $S^\times$, the broken line $s^\times$ indicating the longitudinal axis of the spindle.

As spindle-blades usually taper somewhat, as shown in Fig. 1, the contacts $b^5$ are made adjustable to compensate for the taper, the upper contact being set out slightly more than the lower one. Of course with a cylindrical blade or for a cylindrical bobbin the contacts would be set alike.

By applying the device as shown in Fig. 1 the deviation of the spindle from the vertical is indicated by the level, and after one or more adjustments and subsequent tests with the plumbing device perfect vertical position of the spindle can be attained. Manifestly the tests can be made with perfect ease even though the spindle is running, as it is only necessary to bring the contacts lightly into simultaneous engagement with the spindle-blade by a light touch, the level indicating the exact position of the spindle with relation to the true vertical position required.

My invention is not restricted to the precise construction and arrangement herein shown and described, as the same may be modified in various particulars without departing from the spirit and scope of my invention.

Having fully described my invention, what I claim as new, and desire to secure by Letters Patent, is—

1. In a device for plumbing spinning-spindles, a handpiece, an elongated level-carrier fulcrumed between its ends thereon, and having lateral extensions at its ends to contact with a spindle-blade, and a level mounted on the level-carrier at right angles to its length.

2. In a device for plumbing spinning-spindles, a handpiece, an elongated level-carrier fulcrumed between its ends thereon and having adjustable lateral extensions at its ends to contact with the spindle-blade or with a bobbin thereon, and a level mounted on the level-carrier between its ends and at right angles to its length.

3. In a device for plumbing spinning-spindles, a handpiece having a bifurcated end, an elongated level-carrier fulcrumed between its ends upon the bifurcated end of the handpiece, a level mounted on the carrier at right angles to its fulcrum and to its length, and lateral extensions on the ends of the level-carrier to contact with the spindle-blade or a bobbin thereon.

4. In a device for plumbing spinning-spindles, a handpiece having a bifurcated end, an elongated level-carrier journaled on the handpiece between the bifurcations thereof, a level mounted on the carrier between its ends and at right angles to its longitudinal axis, and adjustable contacts mounted on the ends of the carrier parallel to each other and to the level.

5. In a device for plumbing spinning-spindles, a handpiece, a swinging member pivotally mounted thereon and having lateral extensions or contacts at its ends, and a level on said member in parallelism with the said extensions or contacts.

In testimony whereof I have signed my name to this specification in the presence of two subscribing witnesses.

ALONZO E. RHOADES.

Witnesses:
ERNEST WARREN WOOD,
GEORGE OTIS DRAPER.